[11] 3,585,582

[72] Inventor Robert A. Dove
960 Tripp Drive, West Palm Beach, Fla. 33480
[21] Appl. No. 602,076
[22] Filed Dec. 15, 1966
[45] Patented June 15, 1971

[54] SIGNAL DEVICE FOR A BOAT TRAILER
9 Claims, 5 Drawing Figs.
[52] U.S. Cl............................................. 340/52,
340/59, 340/244, 200/84, 200/152, 116/110, 73/290
[51] Int. Cl..................................................... B60q 1/00
[50] Field of Search........................................... 340/52, 59,
70, 244, 235, 258, 282; 200/61.04, 52, 61.44, 84,
152; 116/109, 110, 118; 73/290, 301, 305, 307—309, 313

[56] References Cited
UNITED STATES PATENTS
| | | | |
|---|---|---|---|
| 2,794,973 | 6/1957 | Lowther, Jr. | 340/244 |
| 799,410 | 9/1905 | Smith | 340/244 |
| 1,324,522 | 12/1919 | Saltzman | 340/244 |

*Primary Examiner*—Alvin H. Waring
*Attorneys*—Clarence A. O'Brien and Harvey B. Jacobson ABSTRACT: A signal device for a boat trailer having a housing attached to the axle of a boat trailer by an elastic member and a float, battery assembly and horn assembly mounted in the housing with the float closing an energizing circuit from the battery assembly to the horn assembly when the wheels on the axle reach a certain point in a body of water during launching of a boat carried by the trailer to alert the operator of the towing vehicle and prevent water from coming into contact with the wheel bearings.

PATENTED JUN 15 1971
3,585,582
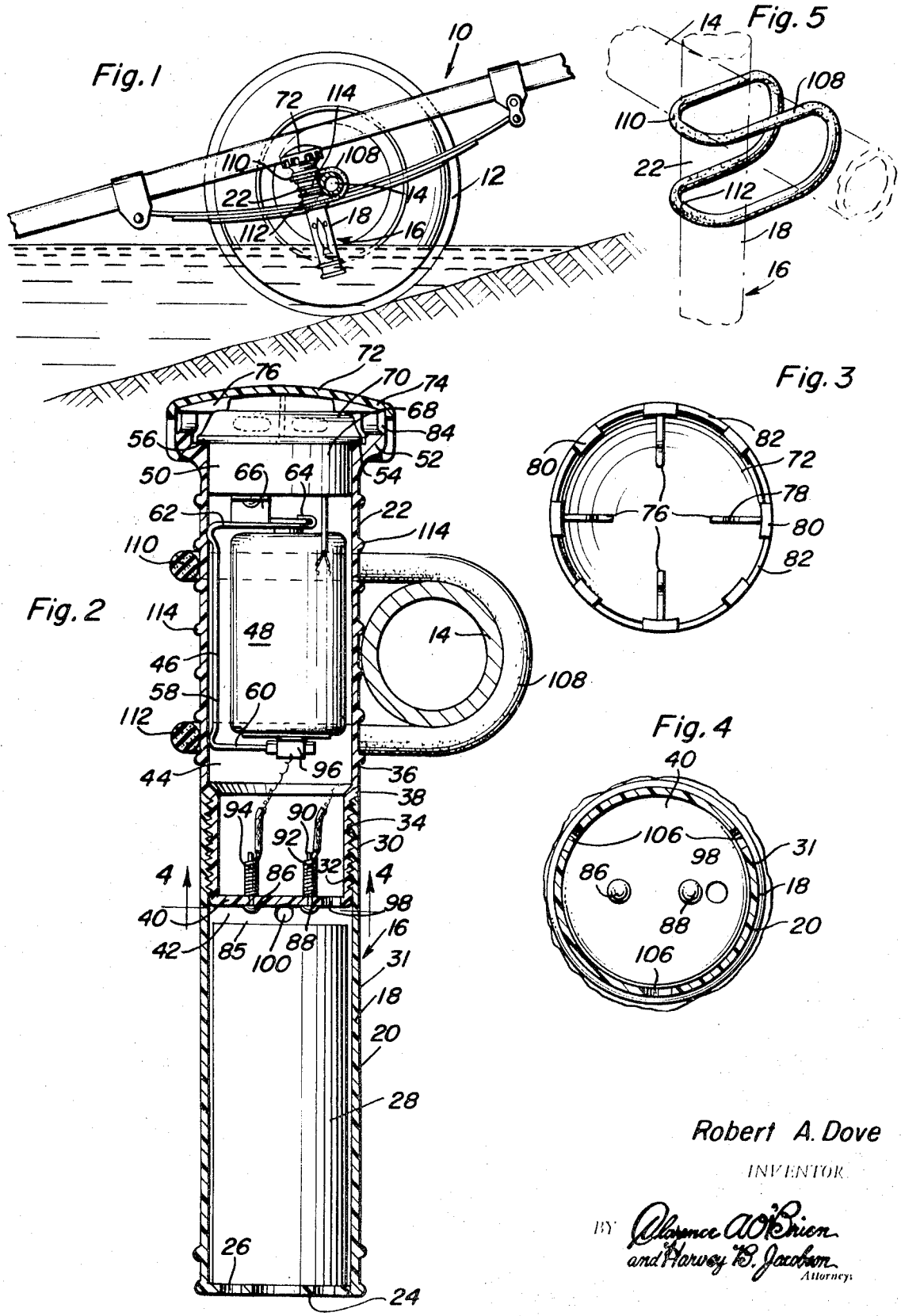
Robert A. Dove
INVENTOR
BY Clarence A. O'Brien
and Harvey B. Jacobson
Attorneys

SIGNAL DEVICE FOR A BOAT TRAILER

A primary object of the present invention is to provide signal means in association with a boat trailer, the signal means being operative to signal to the operator of the towing vehicle when to stop the vehicle in order to prevent water from entering the bearings of the trailer wheels and causing corrosion to such bearings as the trailer wheels are moved into a body of water during the launching of a boat carried by the trailer.

Another important object of the present invention is to provide means for semipermanently installing a signal device on a boat trailer adjacent to the wheels and to form the device in such a way that the signal components within a housing, that is semipermanently installed on the trailer, can be removed and replaced without removing the housing from its attachment to the trailer.

Another important object of the present invention is to provide an elastic mounting arrangement for mounting a signal device on the axle of a boat trailer so that the signal device is generally perpendicular to the axle and is permitted to move when contacting foreign objects, thereby decreasing possibility of damage, the elasticity of the mounting returning the device to its initial preset position and means being provided for eliminating movement of the entire assembly during transportation of the trailer to the boat launching site.

Another important object of the present invention is to provide a simple, effective and compact signal device for a boat trailer and to provide a reliable and simple elastic mounting arrangement for mounting the device on the axle of the boat trailer.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a side elevational view of the signal device showing the same mounted on the axle of a boat trailer, which is fragmentarily shown in relation to the position that the trailer and supporting wheels assume during the launching of a carried boat in a body of water;

FIG. 2 is a longitudinal vertical sectional view on an enlarged scale of the signal device and showing in greater detail the mounting arrangement thereof;

FIG. 3 is a bottom plan view of the snap-on cap which closes off the upper end of the housing for the signal device;

FIG. 4 is a transverse, horizontal sectional view, taken substantially on line 4—4 of FIG. 2, and, FIG. 5 is a fragmentary perspective, somewhat diagrammatic view, showing the attaching of the signal device to the axle by means of an elastic, endless cord.

Referring now more particularly to the accompanying drawings, and initially to FIG. 1, the reference numeral 10 generally designates a conventional boat trailer which is drafted by a towing vehicle (not shown) and which is supported by ground-engaging wheels 12 carried by an axle 14 and having conventional bearings. In launching a boat which is carried by the trailer 10, the operator of the towing vehicle backs the trailer into a body of water, as shown in FIG. 1. In present practice, the operator of the towing vehicle requires the services of an assistant, whose duty is to signal to the operator when to stop the towing vehicle in order to prevent water from coming in contact with the bearings of the trailer wheels 12 and causing corrosion to such bearings.

It is the primary aim and purpose of the present invention to provide a signal means or device 16, which takes the place of an assistant and is more reliable than an assistant, who must depend upon his visual observation of the movement of the wheels 12 into the body of water, the signal means or device being automatic in operation to signal to the operator of the towing vehicle when the trailer wheels 12 have been submerged to a predetermined level beyond which the wheels should not move into the body of water. By means of the automatic signal device 16, the operator of the towing vehicle knows for certain when the trailer is in the proper launching position without the need of an observer.

The signal device 16, as shown more particularly in FIGS. 2 through 4, includes a tubular housing 18, which is formed from high impact polystyrene or any high impact commercial plastic and is composed of two sections 20 and 22. The housing or case 18 is suitable for mounting in a position generally perpendicular to the trailer axle 14 or adjacent components which are stationary in relation to the axle 14. Preferably, the housing or case 18 is attached to the axle 14. The housing or case 18 is attached to the axle so that it is disposed generally perpendicular to the axle and the trailer frame and, thus, the section 20 may be termed the lower section, while the section 22 may be referred to as the upper section.

The lower section 20 has an imperforate sidewall and is provided with an end wall 24 which forms the bottom wall for the housing or case 18, the bottom wall 24 being provided with a series of apertures 26 for the admission of water into the lower end section 20 of the housing or case. A cylindrical float 28 is disposed within the lower end section 20 and is adapted to be moved upwardly in the housing or case 18 by virtue of the water entering through the openings or apertures 26 in the bottom wall 24 when the casing or housing is submerged in the water, as shown in FIG. 1. The upper end portion 30 of the sidewall 31 of the lower end section 20 of the housing or case 18 is internally threaded, as at 32, to receive the coaxially reduced exteriorly threaded lower end portion 34 of the upper end section 22. The upper end section 22 has a cylindrical sidewall 36, which complements the sidewall 31 of the lower end section and is formed with a circumferential shoulder 38 that receives the distal end of the upper end portion 30 of the sidewall 31 of the lower end section 20.

The upper end section 22 is formed with a bottom wall 40, which constitutes a transverse partition wall in the housing or case 18 and divides the interior thereof into two compartments, the lower compartment 42 being within the lower end section and within which the float 28 is movably disposed. The upper compartment 44 supports a mounting means 46 for a conventional dry cell battery 48 and houses a horn 50, which is energized by the battery 48 under the rising action of the float 28 after the housing or case has been submerged to a certain point in the body of water, as will be described.

The sidewall 36 of the upper section 22 terminates at its upper end in a bell-shaped end portion 52, which has an internal flat annular shoulder 54 disposed normal to the longitudinal axis of the overall housing or case 18 and which has an external shoulder 56.

The battery 48 is removably clamped within the supporting clip 46, which is generally of channel-shaped construction, having a web portion 58 and opposing lateral, parallel legs 60 and 62. The clip is made from a resilient material and the web portion is bent outwardly at its outer ends or at the juncture points with the leg portions to engage the interior of the sidewall 36 of the upper section 22. The upper leg 62 of the battery supporting clip terminates at its outer end in a U-shaped clamping portion 64 and a bracket 66 upstands from one side thereof so as to support the bottom of the housing 68 for the horn 50. The housing 68 is formed with an upper or outer bell-shaped end 70 which seats on the shoulder 54 so that the horn and battery are suspended from the shoulder 54.

A cap 72, which is formed from high impact plastic material, the same as the housing or case 18, is provided and the cover portion 74 thereof is slightly concavo-convex, with ribs 76 extending downwardly and radially inwardly and being configured to bear on the bell-shaped end of the horn housing so as to hold the horn housing down.

The cap 72 has depending clamping fingers 80 disposed in circumferentially spaced fashion, as shown in FIG. 3, to provide circumferentially spaced-apart spaces 82, which are alignable with notches or openings 84 formed radially through the end edge of end portion 52 to permit sound to pass outwardly from the horn. The cap 72 may be rotated to allow the operator to vary the volume of sound emitted.

The float 28 is provided at its upper end with a conductive disc 85, which is adapted to cooperate with contacts 86 and 88 in the form of heads of pins 90, the contacts 86 and 88 being disposed on the underside of the partition wall 40 with the pins extending through the partition wall and having conductors 92 and 94 fixed thereon. The conductor 94 is attached to a contact 96 on the arm 60 which engages one end of the battery while the conductor wire 92 is attached to the horn. The energizing circuit for the horn, which includes the conductors 92 and 94, is completed from the battery to the horn when the conductive disc 85 bridges the two contacts 86 and 88, under the upward floating impetus given it by the water entering the apertures 26 as the housing or case 18 is submerged in the body of water, as shown in FIG. 1.

The partition wall 40 is formed with a small offcenter opening 98 which serves as a drainhole for the compartment 44 and the sidewall 31 of the lower section 20 is provided just below the transverse partition wall 40 with radial openings 100 which serve as air bleedoff holes for easy operation of the float 28.

As aforestated, the housing or case 18 can be attached to any part of the trailer structure 10 but preferably it is attached to the axle 14 and the case 18 is mounted to the axle by an endless piece of elastic cord 108, as shown in FIGS. 2 and 5. The elastic cord is looped around the axle so that it has two rearwardly projecting loops, an upper loop 110 and a lower loop 112. The sidewall 46 of the upper section 22 is formed with a series of longitudinally spaced annular bosses or ribs 114, which are molded integral with the upper section and which are adapted to bear against the axle, as shown in FIG. 2, with the closed ends of the loops 110 and 112 encircling the outer surface of the sidewall 46 and being disposed in vertically spaced relation and being preferably interposed between adjoining spaced ribs, as shown in FIG. 2. The ribs 114 eliminate movement of the entire assembly during transportation of the trailer to the launching site. The elastic mounting cord 108 permits the casing to move in the event it contacts a foreign object with the elasticity of the attaching cord tending to return the housing or case to its normal position, generally perpendicular to the axle, as shown in FIGS. 1 and 2.

The installation is of a semipermanent nature since once the housing or case is attached by the elastic loops to the axle, it is not removed. Disassembly for battery replacement or other maintenance can be performed without removing the housing or case from the axle. To replace the battery 48, the snap-on cap 72 is removed, thereby allowing the horn assembly 50 and battery assembly 48 to be extracted vertically through the upper open end of the casing. To obtain access to the contacts on the float 28, the bottom section 20 of the housing or case can be unscrewed from the upper section 22, which is mounted to the axle 14.

In use, the float 28 will seat on the bottom wall 24 but as the trailer is moved into a body of water, as shown in FIG. 1, for launching a boat carried by the trailer, the trailer wheels 12 will be submerged in the water. When the trailer wheels have been submerged to a predetermined level, as determined before mounting the case or housing 18, the water will enter through the openings 26 in the bottom wall and gradually raise the float 28. Before the water can come into contact with the bearing assemblies of the wheels, the conductive disc 85 on the upper end of the float 28 will bridge the contacts 86 and 88 and establish the energizing circuit for the horn which will emit a loud, extremely audible sound, this sound passing through the openings 84 and the output portions or openings 82 and being highly audible to the operator of the towing vehicle so that the operator can realize that the trailer should not be moved any further into the body of water.

Accordingly, it is submitted that a compact, inexpensive but reliable and efficient signal device has been provided for association with a boat trailer so as to positively prevent the water from coming in contact with the bearings of the trailer wheels 12 by giving off an audible signal to the operator of the towing vehicle and alerting the operator that the trailer wheels 12 should not be moved any further into the body of water.

What I claim as new is as follows:

1. In combination with a boat trailer adapted to be coupled to a towing vehicle and having an axle supporting ground-engaging wheels provided with bearings, signal means for indicating to an operator of the towing vehicle when the trailer has been moved into a body of water for launching or recovering a boat carried by the trailer before the water can come into contact with the wheel bearings, and means for mounting the signal means on the trailer in stationary relation to the wheel bearings, said signal means including a housing, a float in said housing, a signalling assembly, battery means for energizing said signalling assembly disposed in said housing and contact means in said housing adapted to be engaged by the float to complete an energizing circuit from the battery to the signalling assembly whereby the signalling assembly is rendered operative, said means for mounting the signal means retaining the housing so that the float is substantially vertically movable and is moved upwardly by action of the water entering through openings in the housing.

2. In combination with a boat trailer adapted to be coupled to a towing vehicle and having an axle supporting ground-engaging wheels provided with bearings, signal means for indicating to an operator of the towing vehicle when the trailer has been moved into a body of water for launching or recovering a boat carried by the trailer before the water can come into contact with the wheel bearings, and means for mounting the signal means on the trailer in stationary relation to the wheel bearings, said signal means including a housing and said mounting means including an endless elastic cord encircling the axle and having upper and lower loops within which the housing is fixed so as to clamp the housing to the axle in a generally perpendicular position.

3. The invention of claim 2, wherein said housing has external annular ribs adapted to engage the axle.

4. The invention of claim 2, wherein said housing is disposed substantially perpendicular to the axle, a float in the housing, said housing having openings for the admission of water therein to act on the float and an audible signal assembly including a battery mounted in the housing and an energizing circuit including contacts engaged by the float.

5. The invention of claim 4, wherein said housing has a separable upper and lower section, said lower section defining a compartment for the float and having an end wall provided with apertures for acting on the underside of the float, a partition wall in said housing, said partition wall carrying on its underside the contacts and the upper end of the float having a conductive disc adapted to bridge the contacts and establish the energizing circuit.

6. A signal device for signaling the positioning of the wheels of a boat trailer in a body of water during launching of a boat on the trailer so as to prevent water from coming into contact with the bearings of the wheels, said device comprising a housing, means mounting the housing on the trailer in a generally perpendicular position adjacent the wheels, said housing having a lower end section and an upper end section, a float disposed in the lower end section, said lower end section having an end wall provided with openings for the admission of water to act on the underside of the float, contact means disposed in the housing and closed by the upper end of the float when the housing has been submerged a predetermined distance within the water, a removable battery and horn assembly, an energizing circuit controlled by the contacts and energized by connection to the battery, said battery and horn assemblies being removably mounted in the upper end section, said upper end section having an open upper end, a removable snap cap closing off said end and said end cap having openings for the emission of sound from the horn to the atmosphere.

7. The invention of claim 6, wherein said sections are formed from plastic and are separable, said sections having adjoining threaded ends.

8. The invention of claim 6, wherein said housing is tubular and the upper end section is formed with annular ribs on its outer surface, said ribs being disposed in spaced relation along the longitudinal axis of the upper section and a closed elastic loop forming member embracing the axle and having endless upper and lower loops encircling the upper end section of the housing and clamping the end section to the axle with the ribs engaging the axle and preventing movement of the housing during transportation of the trailer to the launching site.

9. The structure as defined in claim 1 wherein said signalling assembly includes a horn, said housing including a tubular upper end receiving said horn, a removable cap retaining said horn in the upper end of the housing with the cap having openings for the emission of sound from the horn, said means mounting the signal means on the trailer including a flexible member encircling the housing and the axle for mounting the housing adjustably on the axle.